United States Patent [19]
Hayden Steven M.

[11] Patent Number: 5,026,564

[45] Date of Patent: Jun. 25, 1991

[54] APPARATUS AND METHOD FOR TREATMENT OF VARIOUS LIQUID OR SLURRY BY ULTRASONIFICATION IN CONJUCTION WITH HEAT AND PRESSURE

[76] Inventor: Hayden Steven M., 407 N. Broad St., Wetumpka, Ala. 36092

[21] Appl. No.: 548,492

[22] Filed: Jul. 2, 1990

[51] Int. Cl.$^5$ ............................ A23L 3/00; A23C 3/00
[52] U.S. Cl. ...................................... 426/237; 99/451; 422/20; 426/238; 426/522
[58] Field of Search ............... 426/237, 238, 519, 522; 99/451, 348; 422/20, 22

[56] References Cited

U.S. PATENT DOCUMENTS

| | | | |
|---|---|---|---|
| 2,585,103 | 2/1952 | Fitzgerald | 99/451 |
| 4,211,744 | 7/1980 | Boucher | 422/20 |
| 4,708,878 | 11/1987 | Hagelauer et al. | 99/451 |

Primary Examiner—George Yeung
Attorney, Agent, or Firm—Jennings, Carter, Thompson & Veal

[57] ABSTRACT

A treatment of a liquid or slurry which combines the effects of heat, ultrasonification, and pressure to produce an effective bactericide. The ultrasonification effect is enhance 10-20 fold by the addition of pressure during the heat and ultrasonification treatment. The pressure results in enhancement of the cavitational effect. The enchance of the cavitational effect results in the heat becoming a more effective bactericide at a lower temperature and shorter duration.

12 Claims, 1 Drawing Sheet

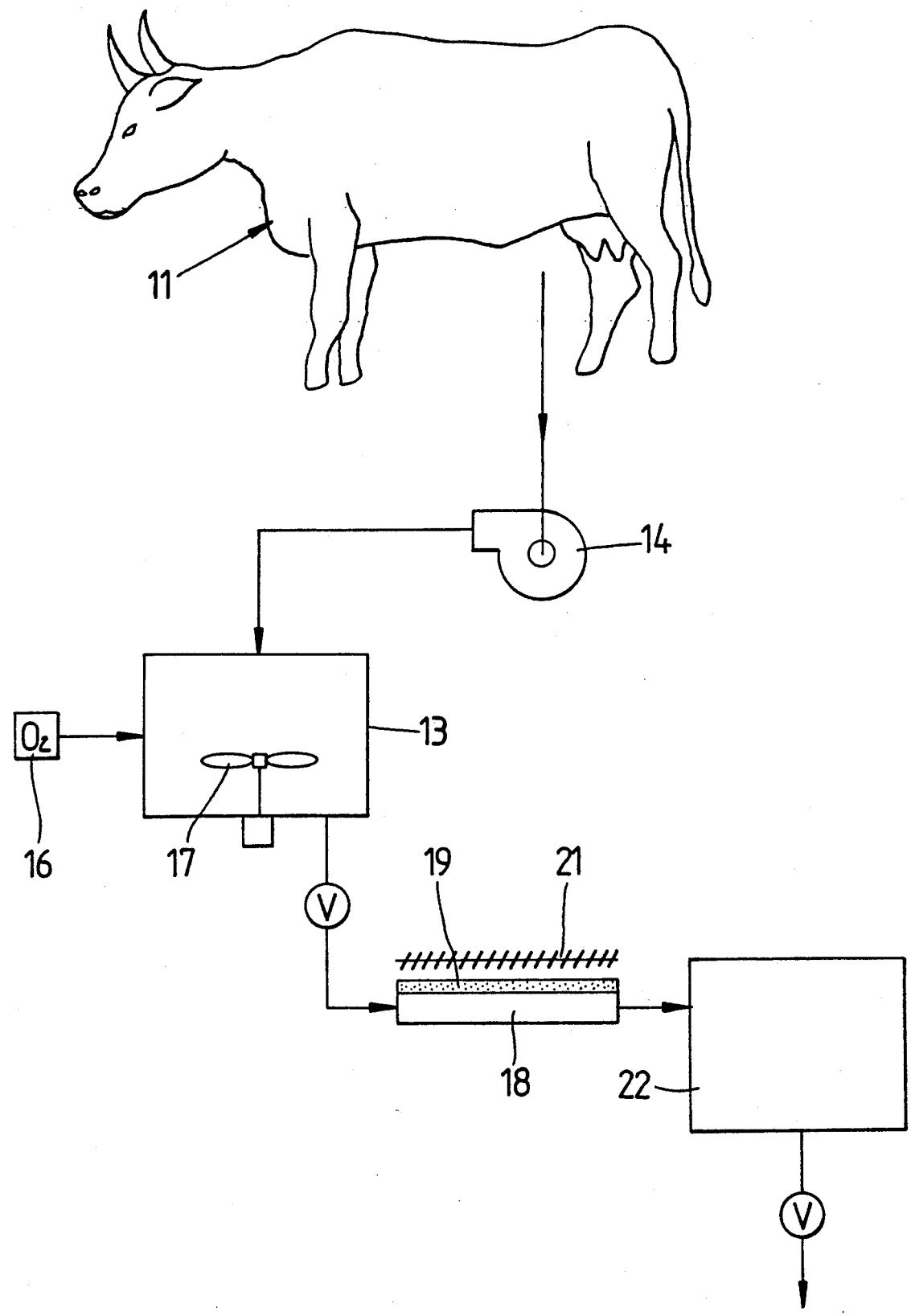

APPARATUS AND METHOD FOR TREATMENT OF VARIOUS LIQUID OR SLURRY BY ULTRASONIFICATION IN CONJUCTION WITH HEAT AND PRESSURE

FIELD OF THE INVENTION

The present invention relates to the treatment of various liquid or slurry with bactericidal ultrasonification in conjunction with heat and pressure. More particularly, the present invention relates to the treatment of various liquid or slurry to produce a cavitational effect at a level which will not compromise the components which comprise the liquid or slurry.

BACKGROUND OF THE INVENTION

Utilizing ultrasonification to disrupt biological structures has long been recognized in the medical and scientific research field as well as the industrial field. As early as the 1920's, ultrasonification has been known to cause a killing effect upon organisms as reported in various scientific journals.

In *American Laboratory*, "Ultrasonic Disruption", October 1975 pp. 75-85, Howard Alliger reported fragile cells, such as blood cells and Esherichia Coli are disrupted when exposed to ultrasonification. The sonificated bacteria was reported by Alliger to have thinner cell walls than non-sonificated bacteria. This thinning of the cell walls was attributed to the freeing of cytoplasmic layers from the cell wall.

In a later article published in the *Journal of Dairy Research*, "Effect of Combined Ultrasonic and Heat Treatment, (thermoultrasonification) on the survival of *Staphylococcus aureus*", 1987, pp 61-67, Juan Ordonez and others reported ultrasonification in conjunction with heat was an effective treatment for destruction of *Staphylococcus aureus* and was more effective than heat alone. The authors further noted treating solutions with ultrasonic waves had several other positive side effects such as: homogenizing of fat in milk; expelling of gases in solution; and increasing of antioxidant activity in milk.

In the book *Ultrasound Its Chemical, Physical, and Biological Effect* published in 1988 by VCH Publishers, R. E. Verrall and C. M. Sehgal summarized results obtained in studies performed to determine the origin of sonoluminescence (SL), which is the emission of light when ultrasound is applied to a medium containing dissolved gases. They reported sonoluminescence increased 10-20 times in a solution as pressure was applied. The studies reported by Verrall and Sehgal did not determine whether the increase in sonoluminescence was a result of an increase in cavitational intensity of individual events or the result of increase in the actual number of bursting bubbles. However, the experiments unequivocally showed that pressure increased the cavitation effect in the saturated solution.

Specifically, the studies reported by Verrall and Sehgal substantiate the linear dependence of ultrasonic power to hydrostatic pressure. The reported studies showed that the ultrasonic power applied will determine the maximum pressure that can be applied to the solution, liquid or slurry. In conclusion, the intensity of the ultrasonic power i.e. sound field will determine the numerical value of pressure that is necessary to obtain the maximum cavitational intensity for the particular ultrasonic power. Therefore, in my invention when the liquid or slurry is being sonificated with a ultrasonic power source of a specific frequency and intensity, the numerical value of pressure necessary for maximum cavitational effect will be constant for that particular ultrasonic power source.

Studies by the inventor performed at Kenneth E. Johnson Research Center Consortium for the Space Life Sciences Microbiology Laboratory, Huntsville, Alabama yielded results that a lower temperature could be used to obtain a particular percentage kill of microbes when ultrasonification was utilized with heat. The maximum temperature necessary to obtain "sterility" was 44 C.(111 F.). The present temperatures used in the food industry today to obtain sterility are much higher. Two medias, which represented characteristics of various beverages found in the food industry, were used in the *Life Sciences* test—a very hypotonic nutrient broth, similar to milk, and purified water; and different microbes with different cell wall structures were used—*Esherichia Coli, Staphylococcus aureus* and *Bacillus stearothemophilis*. The above microbes represented the various cell wall structures of microbe types which contribute to food industry contamination and spoilage. The *Life Sciences* study teaches that the degree and duration of heat necessary to obtain sterility is lowered when ultrasound is used in conjunction with heat.

My invention by using pressure in conjunction with the heat and ultrasonification will be able to further lower the duration and intensity of heat necessary to obtain sterilization by increasing the effectiveness of the ultrasonification and heat treatment. As the *Life Science* study implies when ultrasonification is applied along with heat the intensity of heat necessary to obtain sterility decreases; therefore, it can be conclude that as the ultrasonification i.e. cavitational effect is increases such as when pressure is applied the heat (temperature) necessary to achieve an acceptable percentage killed will be lowered and, also, the exposure time to a particular temperature will be lowered. My invention will result in flash sterilization being able to be carried out at a lower temperature and for a shorter period of time.

My invention combines heat, ultrasonification and pressure to obtain an effective and efficient bactericide for beverages and food products in the food industry. My invention particular increases the effectiveness of heat and ultrasonification sterilization by utilizing pressure and saturation of the liquid or slurry by gas or gaseous molecules to increase the cavitational effect of ultrasonification; therefore, lowering the duration and intensity of heat necessary to obtain sterilization of a liquid or slurry.

SUMMARY OF THE INVENTION

It is the object of this invention to provide a method and apparatus for sonification of liquid or slurry to create a bactericidal effect without altering the taste or quality of the liquid or slurry, such as a foodstuff.

A further object of this invention is to disrupt cell walls so that the sonificated liquid or slurry has a reduction in viable organisms, thereby enabling storage of the food product with minimum refrigeration.

Yet another object of the invention is to cause the reduction of the heat necessary to cause a bactericidal effect by using sonification in conjunction with heat and pressure.

The cumulative object of the invention is to provide an alternative bactericide procedure where filtration is impossible, halogens are prohibited, preservatives are undesirable and temperatures must be limited to avoid the formation of "off flavors" or undesirable compounds in the treated liquid or slurry.

My invention accomplishes the above objective by initially saturating the liquid or slurry with a gas or gaseous molecule. This saturation increases the affinity of the suspended microbes in the liquid or slurry for the suitable gas or gaseous molecule resulting in the permeation of the gas or gaseous molecules within the hydrophobic lipid structure of the cell wall. Thus, when the liquid is sonificated the gas or gaseous molecules form bubbles, these gaseous bubbles which burst in close proximity to the cell wall cause a shearing effect upon the cell wall structures. This disruption of the cell wall yields a nonviable microbe because the cell wall structure is necessary for replication and continued viability. Further, my invention also pressurizes the gas saturated liquid or slurry during the sonification which results in a 10–20 times increase in the cavitation effect of the solution as indicated by the sonoluminescence studies.

There exist a need for the utilization of the above into practice, however no such teaching or any utilization is known to me.

DESCRIPTION OF A PREFERRED EMBODIMENT

FIG. 1 presents a schematic representation of my invention. A liquid or slurry such as milk, represented in FIG. 1 by a cow, is delivered to a containing means 13. Said containing means 13 is pressurized to apply a pressure to said liquid or slurry between 5TORR and 500TORR. The means for pressuring 14 may be commercially obtained from a number of vendors and, as stated, should produce a pressure between 5TORR and 500TORR.

Subsequent to the liquid 11 being delivered to the containing means 13 suitable gas or gaseous molecule is introduced into the liquid 11. A means for introducing 16 may also be commercially obtained from a number of vendors in the food industry. The means for introducing 16 should be capable of introducing the gas or gaseous molecules into a pressurized solution. The gas can be oxygen or nitrogen or any other gas or gaseous molecule whose over-all structure will intermesh within the lipid structure of the cell wall. The gas is dispersed throughout the liquid by a agitating means 17. The agitating means, a blade having mobility to move throughout the liquid, insures homogeneity throughout the liquid to properly locate the gas or gaseous molecules in proximity with the lipid structure of the cell wall so that emersion can take place more easily.

Next, the liquid may be transferred from the containing means 13, a bin sealed and capable of with standing introduction of gases and pressure, to a means operably connected to receive and confine the solution during a period of sonification, heating, and continued pressurization. The confining means 18, a vat having a design allowing even exposure to the applied heat, pressure and ultrasonification and allowing exposure to ultrasonification simultaneously while continued higher atmospheric pressure is applied. The ultrasonification in conjunction with the higher atmospheric pressure causes the gas or gaseous molecules to be released from the lipid structure of the cell wall. Subsequent to release they form gaseous bubbles which burst when sonificated causing a shearing force to be applied to the cell wall resulting in cell wall structures breaking apart. Further, as stated above, the higher pressure results in an over-all increase in cavitational effect. The ultrasonification should be of an intensity of 3 watts per cm2 to 30,000 watts per cm2 and at a frequency of 500 khz to 50 mhz. The means for sonificating 19 may be commercially obtained from a number of vendors.

The confining means 18 as well as containing means 13 should have a means for controlling temperature of solution 21. The means for controlling temperature 21 should produce a range of temperatures. The necessary temperature for the solution will be determined by testing. As the studies carried out for the inventor at *Life Sciences* indicate temperature values and duration of exposure to heating varies as to a particular liquid or slurry.

The liquid or slurry being treated further will be the factor which determines the intensity and frequency of the ultrasonic power source. However, as state above, the ultrasonic power source utilized will determine the numerical value for the pressure applied to the liquid or slurry to obtain the peak cavitational effect.

Testing of the liquid or slurry for a particular percentage kill will substantiate numerical valves for the parameters for intensity, frequency, pressurization, duration of heat and ultrasonification because the treatment must yield an acceptable percentage killed.

After the treatment is completed, the liquid or slurry is transferred to a storage means 22.

While I have shown my invention in one form, it will be obvious to those skilled in the art that it is not so limited but is susceptible of various changes and modifications without departing from the spirit thereon.

What I claim is:

1. Apparatus for treating liquid or slurry solutions to reduce bacteriological contamination thereof comprising:
   (a) means for containing a liquid or slurry at a predetermined pressure;
   (b) means for introducing gas into said liquid or slurry within said containing means;
   (c) agitating means within said containing means for dispersing said gas or gaseous molecule through said liquid or slurry;
   (d) means operably connected for receiving said liquid or slurry and confining said liquid or slurry during a period of sonification;
   (e) means for sonificating said liquid or slurry within said confining means; and
   (f) means for controlling temperature and pressure of said liquid or slurry in said containing means and said confining means.

2. An apparatus as defined in claim 1 wherein said means for controlling includes means for applying pressure between 5TORR to 500TORR to said liquid or slurry.

3. An apparatus as defined in claim 1 wherein said means for controlling the temperature within a predetermined temperature range such that bacterial contamination of said liquid or slurry is reduced.

4. An apparatus as defined in claim 1 wherein said means for sonificating includes means for applying an intensity of 3 watts/cm2 to 30,000 watt per cm2 and a frequency of 500 khz to 50 mhz to said liquid or slurry.

5. An apparatus for treating liquid or slurry to reduce bacterial contamination thereof comprising:
   (a) means for saturating liquid or slurry with a soluble gas or gaseous molecule;
   (b) means for pressurizing said saturated liquid or slurry within a predetermined pressure range;

(c) means for sonificating said saturated liquid or slurry at a predetermined intensity; and (d) means for controlling the temperature of said saturated liquid or slurry within a predetermined temperature range such that bacteriological contamination of said liquid or slurry is reduced.

6. An apparatus as defined in claim 5 wherein said means for pressurization includes means for applying pressure between 5TORR to 500TORR to liquid or slurry.

7. An apparatus as defined in claim 5 wherein said means for controlling the temperature maintains a temperature within a predetermined temperature range such that bacterial contamination of said liquid or slurry is reduced.

8. An apparatus as defined in claim 5 wherein said means for sonificating includes means for applying an intensity of 3 watts/cm2 to 30,000 watts per cm2 and a frequency of 500 khz to 50 mhz to said liquid or slurry.

9. A method of treating a liquid or slurry to reduce bacteriological contamination comprising the steps of:

(a) saturating liquid or slurry with gas or gaseous molecules;

(b) pressurizing liquid or slurry within a predetermined pressure range;

(c) maintaining of temperature of liquid and slurry within a predetermined temperature range; and (d) sonificating liquid or slurry at a predetermined intensity, the combination of said steps yielding a reduction in bacterial contamination.

10. A method as defined in claim 9 wherein said pressurizing step pressurizes between 5TORR and 500 TORR.

11. A method as defined in claim 9 wherein said temperature is maintained at a temperature which will be a numerical value determined by the intensity and frequency of the ultrasonification power source and the pressure necessary to obtain maximum cavitational effect at the particular ultrasonification power.

12. A method as defined in claim 9 wherein said sonificating has an intensity between 3 watts/cm2 and 30,000 watts/cm2 and a frequency between 500 khz to 50 mhz.

* * * * *